United States Patent
Wu et al.

(10) Patent No.: US 12,470,564 B2
(45) Date of Patent: Nov. 11, 2025

(54) FEDERATED LOGIN MECHANISMS FOR MULTI TENANT ROLE BASED ACCESS CONTROL

(71) Applicant: Rubrik, Inc., Palo Alto, CA (US)

(72) Inventors: Hao Wu, Mountain View, CA (US); Sai Tanay Desaraju, Redwood City, CA (US); Kevin Mu, Saratoga, CA (US); Xiang Xu, Foster City, CA (US); Lokesh Jagasia, Union City, CA (US); Zhebin Zhang, San Jose, CA (US); Shrihari Kalkar, Santa Clara, CA (US); Anam Bhatia, San Jose, CA (US); Michael Wronski, Johns Creek, GA (US); Arvind Swaminathan, Bangalore (IN); Alex Medovar, San Francisco, CA (US)

(73) Assignee: Rubrik, Inc., Palo Alto, CA (US)

( * ) Notice: Subject to any disclaimer, the term of this patent is extended or adjusted under 35 U.S.C. 154(b) by 311 days.

(21) Appl. No.: 18/187,191

(22) Filed: Mar. 21, 2023

(65) Prior Publication Data
US 2024/0259389 A1    Aug. 1, 2024

(30) Foreign Application Priority Data

Jan. 27, 2023    (IN) .............................. 202341005510

(51) Int. Cl.
*H04L 9/40* (2022.01)
(52) U.S. Cl.
CPC .................................. *H04L 63/105* (2013.01)
(58) Field of Classification Search
CPC .. H04L 63/105; H04L 63/0815; H04L 63/102

USPC ............................................................ 726/4
See application file for complete search history.

(56) References Cited

U.S. PATENT DOCUMENTS

| | | | |
|---|---|---|---|
| 8,949,939 B2* | 2/2015 | Peddada | H04L 63/105 726/4 |
| 10,320,802 B1* | 6/2019 | Scott | H04L 63/104 |
| 10,380,369 B1* | 8/2019 | Noe | H04L 63/104 |
| 11,954,238 B1* | 4/2024 | Tan | H04L 9/0891 |
| 2015/0350212 A1* | 12/2015 | Amiri | H04L 63/10 726/1 |

(Continued)

OTHER PUBLICATIONS

Federated Identity Architecture of the European eID System, Carretero et al., Jan. 2018 (Year: 2018).*

*Primary Examiner* — Jahangir Kabir
(74) *Attorney, Agent, or Firm* — Holland & Hart LLP

(57) ABSTRACT

Methods, systems, and devices for data management are described. A data management system (DMS) may receive a federated login request from a user associated with one or more tenants of the DMS. The DMS may direct the federated login request to a centralized management service. The DMS may receive a security assertion markup language (SAML) assertion that indicates an identity of the user, a set of object-level permissions assigned to the user, and an identifier of a first tenant associated with the user. The DMS may identify one or more computing objects in a cluster of storage nodes that correspond to the first tenant based on the identifier from the SAML assertion. The DMS may determine that the user is authorized to perform a set of actions on the one or more computing objects based on the set of object-level permissions indicated by the SAML assertion.

20 Claims, 11 Drawing Sheets

(56) References Cited

U.S. PATENT DOCUMENTS

2023/0110080 A1\* 4/2023 Hen ..................... H04L 63/105
726/4

\* cited by examiner

FEDERATED LOGIN MECHANISMS FOR MULTI TENANT ROLE BASED ACCESS CONTROL

RELATED APPLICATIONS

The present application claims priority to Indian Patent Application No. 202341005510, entitled "FEDERATED LOGIN MECHANISMS FOR MULTI-TENANT ROLE-BASED ACCESS CONTROL" and filed Jan. 27, 2023, which is assigned to the assignee hereof and expressly incorporated by reference herein.

FIELD OF TECHNOLOGY

The present disclosure relates generally to data management, including federated login mechanisms for multi-tenant role-based access control (RBAC).

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
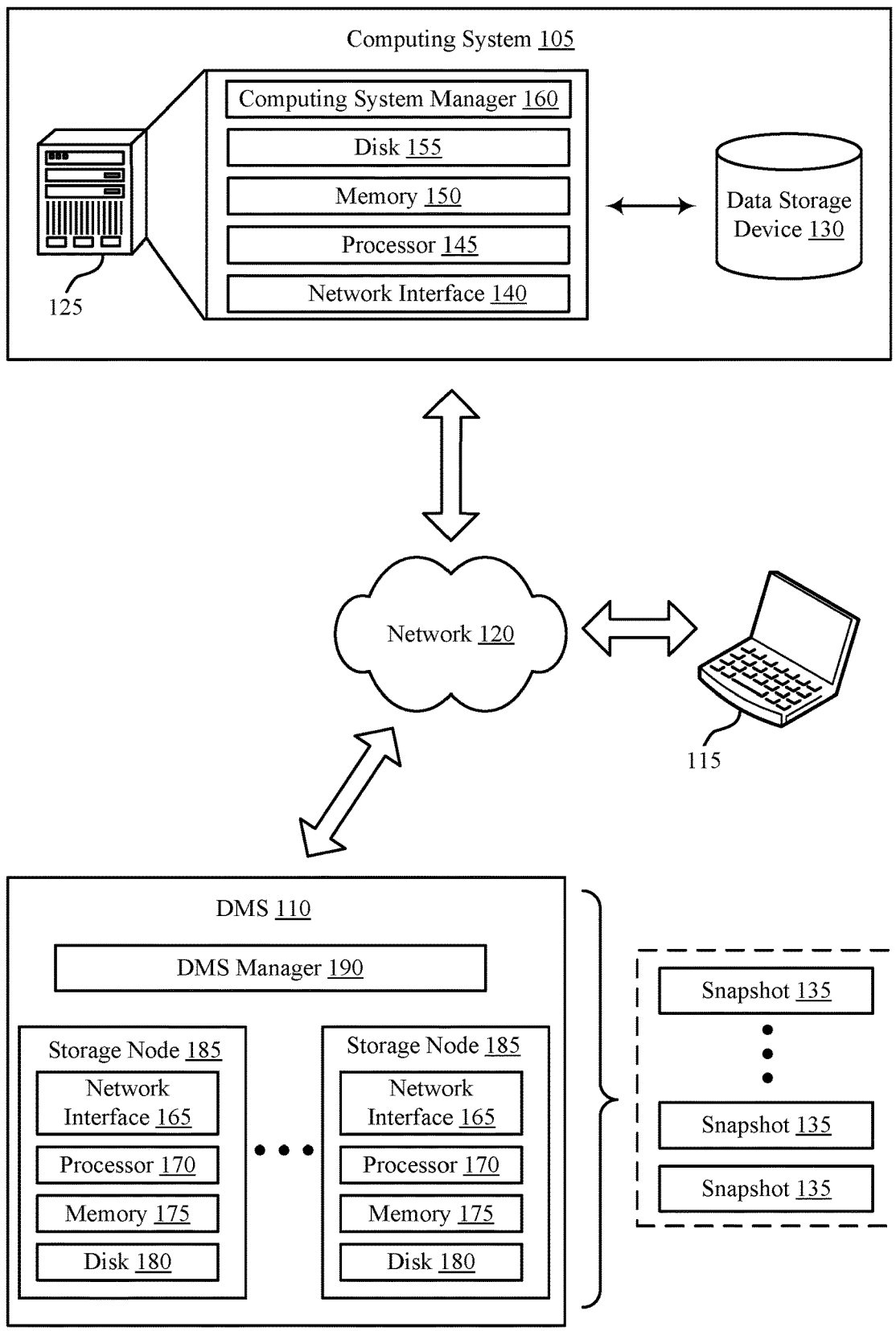
FIG. 1 illustrates an example of a computing environment that supports federated login mechanisms for multi-tenant role-based access control (RBAC) in accordance with aspects of the present disclosure.

A backup and recovery system may use role-based access control (RBAC) to manage which users or administrators can modify or otherwise access specific system resources. RBAC generally refers to the process of assigning permissions to different users of a backup and recovery system. In a multi-tenant data management system (DMS), a single account may include data associated with multiple tenants (such as organizations or business units). Some multi-tenant deployments may involve a multi-level tenant hierarchy. For example, computing resources of the DMS (such as virtual machines or data centers) may be shared among several higher-level tenants, some of which may have lower-level tenants (also referred to as sub-tenants). As such, resources allocated to a higher-level tenant may be shared by multiple sub-tenants of the higher-level tenant.

A multi-tenancy data management system may have resources across cloud platforms and on-premise data centers. In multi-tenant scenarios, multiple tenants (e.g., organizations or business units) may share data management resources. Further, some multi-tenant scenarios may be multi-level, with multiple hierarchical levels of tenants. For example, resources of a backup and recovery system may be shared among multiple higher-level tenants, and at least some of the higher-level tenants may be associated with one or more levels of lower-level tenants (e.g., subtenants), with resources associated with a higher-level tenant being shared by multiple subtenants of that tenant.

As one such example, which may be referred to as an enterprise scenario, an information technology (IT) services unit of a business (e.g., of a corporation) may be a tenant of a data management system, and multiple other business units of the same business (e.g., within the same corporation) may be subtenants of the IT services unit, and accordingly, may share the same data management services. As another such example, some tenants of a data management system may be multi-service providers (MSPs). An MSP may be a higher-level tenant of a backup and recovery system and may provide IT and data management services to multiple distinct customers, which may be separate businesses that are subtenants of the MSPs. For example, the MSP may subscribe to data management services and resources from the data management system, and the MSP may use those services and resources to in turn provide data management service to the MSP's subtenants (e.g., an MSP subtenant may not directly subscribe to the data management system, such as due to a lack of internal expertise in configuring or managing the resources or services of the data management system, and thus the MSP subtenant may instead be customer of the MSP, which may directly subscribe to the data management system and use the MSP's subscription to offer data management services to the MSP subtenant).

There may be many tenants of the data management system, and some or all of the tenants may have any number of subtenants. The tenants of the data management system may be enterprise tenants, MSP tenants, other types of entities, or any combination thereof. Further, an entity that is a subtenant of a higher-level tenant may itself have one or more subtenants. That is, there may be three or more levels of tenants—in general, any quantity of levels may exist.

In some cases, a DMS may enable users to access different sub-systems of the DMS using federated login. As described herein, federated login is a form of identity verification in which a service provider uses a trusted identity provider to verify login requests from unauthenticated users, thereby enabling a user to access multiple resources using a single authentication or set of credentials. As an example, if a user logs into a centralized management service of the DMS (such as Rubrik Polaris, a software-as-a-service (SaaS) platform that consolidates and manages data from various data sources), the centralized management service may establish a federated login session with the user such that the user can access other sub-systems of the DMS (for example, an on-premise cluster of storage nodes) without re-entering the same login credentials again. However, conventional federated login techniques may not be suitable for multi-tenant deployments in which a user may be unauthorized to access some data in an account (i.e., data associated with other tenants or sub-tenants).

Aspects of the present disclosure support techniques for integrating multi-tenant RBAC schemes with federated login mechanisms to ensure that tenant-specific RBAC rules are enforced in all sub-systems of the DMS (for example, when a user attempts to login to an on-premise cluster of storage nodes in the DMS). In some implementations, an on-premise cluster of storage nodes in the DMS may function as a service provider (i.e., the endpoint to which access is requested), and a centralized management service of the DMS may function as the identity provider (i.e., the service responsible for verifying user credentials). Thus, if a user attempts to login to the on-premise cluster of storage nodes (also referred to as a data management cluster or a cloud data management (CDM) cluster), the login request may be redirected from the on-premise cluster of storage nodes to the centralized management service. After receiving the login request from the on-premise cluster of storage nodes, the centralized management service may verify the login request by comparing the credentials provided by the user to account information that is locally accessible to the centralized management service.

If the centralized management service determines that the login request is valid, the centralized management service may retrieve account details for the user, such as a set of RBAC permissions assigned to the user and tenant-specific context information for the login request. If one user is associated with multiple tenants or sub-tenants of the DMS, the centralized management service may determine which tenant the login request corresponds to based on, for example, metadata from the login request. Accordingly, the centralized management service may use the tenant-specific context information to translate the set of RBAC permissions into object-level authorization information (e.g., a list of computing objects the user is authorized to access and a list of actions the user is authorized to perform on said computing objects) and embed both the object-level authorization information and the tenant-specific context information (such as a tenant identifier) in a security assertion markup language (SAML) assertion that is passed back to the on-premise cluster of storage nodes. Including both object-level authorization information and tenant-specific context information may enable the on-premise cluster (or any other sub-system of the DMS) to enforce multi-tenant RBAC and prevent users from performing unauthorized actions.

FIG. 1 illustrates an example of a computing environment 100 that supports federated login mechanisms for multi-tenant RBAC in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through SaaS or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more physical machines, virtual machines, servers 125, databases, or the like. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target data sources within the computing system 105. A snapshot 135 of a data source (e.g., a virtual machine, a database, a filesystem, a virtual disk, a virtual desktop, or other type of computing system or storage system) may be a file (or set of files) that represents a state of the data source (e.g., the data thereof) as of a particular point in time. A snapshot 135 may also be used to restore (e.g., recover) the corresponding data source as of the particular point in time corresponding to the snapshot 135. A data source of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the data source as of a particular point in time. For example, a snapshot 135 may include metadata associated with (e.g., that defines a state of) some or all data blocks included in (e.g., stored by or otherwise included in) the data source. Snapshots 135 (e.g., collectively) may capture changes in the data blocks over time. Snapshots 135 generated for the target data sources within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target data source associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target data source into a frozen state (e.g. a read-only state). Setting the target data source into a frozen state may allow a point-in-time snapshot 135 of the target data source to be stored or transferred.

In some examples, the computing system 105 may generate the snapshot 135 based on the frozen state of the data source. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target data source, and the DMS 110 may generate a snapshot 135 of the target data source based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target data source that has been set into a frozen state may be written by the computing system 105 to a separate file (e.g., an update file) or other entity within the computing system 105 while the target data source is in the frozen state. After the snapshot 135 (or associated data) of the target data source has been transferred to the DMS 110, the computing system manager 160 may release the target data source from the frozen state, and any corresponding updates written to the separate file or other entity may be merged into the target data source.

In response to a restore command (e.g., from a computing device 115 or the computing system 105), the DMS 110 may restore a target version (e.g., corresponding to a particular point in time) of a data source based on a corresponding snapshot 135 of the data source. In some examples, the corresponding snapshot 135 may be used to restore the target version based on data of the data source as stored at the computing system 105 (e.g., based on information included in the corresponding snapshot 135 and other information stored at the computing system 105, the data source may be restored to its state as of the particular point in time). Additionally or alternatively, the corresponding snapshot 135 may be used to restore the data of the target version based on data of the data source as included in one or more backup copies of the data source (e.g., file-level backup copies or image-level backup copies). Such backup copies of the data source may be generated in conjunction with or according to a separate schedule than the snapshots 135. For example, the target version of the data source may be restored based on the information in a snapshot 135 and based on information included in a backup copy of the target object generated prior to the time corresponding to the target version. Backup copies of the data source may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the data source and transfer the data of the restored data source to the computing system 105. And in some examples, the DMS 110 may transfer one or more snapshots 135 to the computing system 105, and restoration of the target version of the data source may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a data source based on a snapshot 135 corresponding to the data source (e.g., along with data included in a backup copy of the data source) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the data source for access by the computing system 105, the DMS 110, or the computing device 115.

In some examples, the DMS 110 may store different types of snapshots, including for the same data source. For example, the DMS 110 may store both base snapshots 135 and incremental snapshots 135. A base snapshot 135 may represent the entirety of the state of the corresponding data source as of a point in time corresponding to the base snapshot 135. An incremental snapshot 135 may represent the changes to the state-which may be referred to as the delta—of the corresponding data source that have occurred between an earlier or later point in time corresponding to another snapshot 135 (e.g., another base snapshot 135 or incremental snapshot 135) of the data source and the incremental snapshot 135. In some cases, some incremental snapshots 135 may be forward-incremental snapshots 135 and other incremental snapshots 135 may be reverse-incremental snapshots 135. To generate a full snapshot 135 of a data source using a forward-incremental snapshot 135, the information of the forward-incremental snapshot 135 may be combined with (e.g., applied to) the information of an earlier base snapshot 135 of the data source along with the information of any intervening forward-incremental snapshots 135, where the earlier base snapshot 135 may include a base snapshot 135 and one or more reverse-incremental or forward-incremental snapshots 135. To generate a full snapshot 135 of a data source using a reverse-incremental snapshot 135, the information of the reverse-incremental snapshot 135 may be combined with (e.g., applied to) the information of a later base snapshot 135 of the data source along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more data sources of the computing system 105, metadata for one or more data sources of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware).

Additionally or alternatively, the DMS 110 may relocate data or create copies of data based on using one or more snapshots 135 to restore the associated data source within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In accordance with aspects of the present disclosure, the DMS 110 may receive, at a user interface associated with a cluster of storage nodes 185, a federated login request from a user associated with one or more tenants of the DMS 110. The DMS 110 may redirect the federated login request from the cluster of storage nodes 185 to a centralized management service (such as the centralized management service 405 described with reference to FIG. 4). The DMS 110 may receive, from the centralized management service, a SAML assertion that indicates an identity of the user, a set of object-level permissions assigned to the user, and an identifier of a first tenant of the one or more tenants associated with the user. The DMS 110 may identify one or more computing objects (such as storage nodes 185, virtual machines, servers, or the like) that correspond to the first tenant based on the identifier from the SAML assertion. The DMS 110 may determine that the user is authorized to perform a set of actions on the one or more computing objects based on the set of object-level permissions indicated by the SAML assertion.

Figure 2:
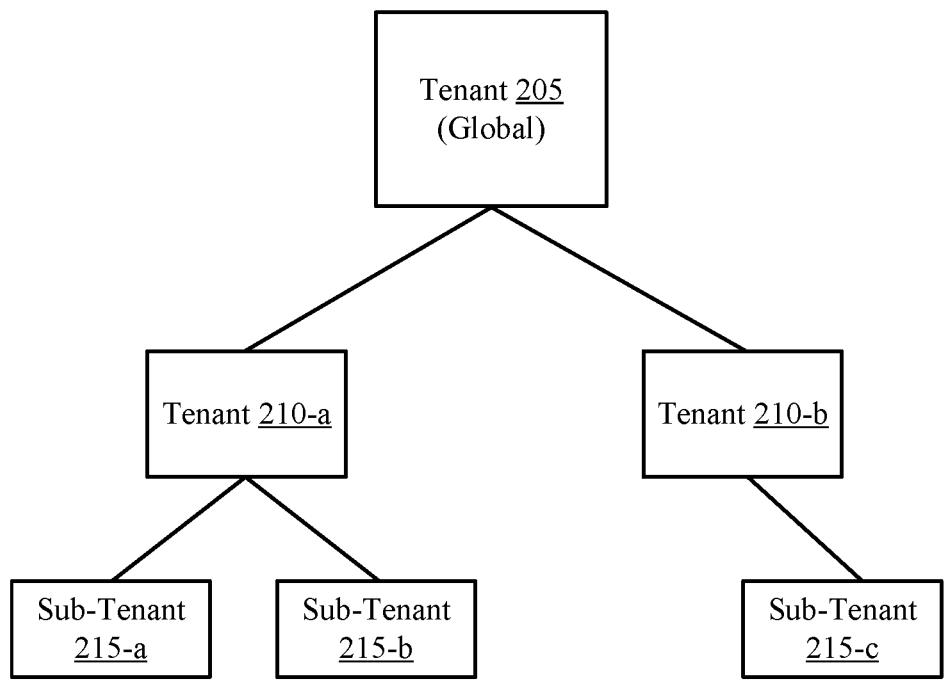
FIG. 2 illustrates an example of a multi-tenant system that supports federated login mechanisms for multi-tenant RBAC in accordance with aspects of the present disclosure.

FIG. 2 illustrates an example of a multi-tenant system 200 that supports federated login mechanisms for multi-tenant RBAC in accordance with one or more aspects of the present disclosure. The multi-tenant system 200 may implement or be implemented by aspects of the computing environment 100. For example, the multi-tenant system 200 includes a tenant 205 (i.e., a global organization), a tenant 210-a, a tenant 210-b, a sub-tenant 215-a, a sub-tenant 215-b, and a sub-tenant 215-c, each of which may correspond to a computing system 105 supported by the DMS 110. In accordance with aspects of the present disclosure, a DMS may provide backup and recovery services for one or more data sources (also referred to as snappables) associated with the tenant 205, the tenants 210, and/or the sub-tenants 215.

As described herein, a global organization (such as the tenant 205) may provide IT services, including backup and recovery protection, via a DMS, to multiple tenants (e.g., the tenant 210-a and the tenant 210-b). In some cases, a higher-level tenant (such as the tenant 210-a) may have sub-tenants 215. As an example, the tenant 205 may be an IT service unit within an organization, and the tenants 210 may be business units of (or teams within) the organization. The sub-tenants 215 may be sub-divisions or sub-teams of the business units corresponding to the tenants 210 (e.g., working groups within the business unit). For example, the sub-tenant 215-c may be a sub-business unit or sub-teams of the business unit corresponding to the tenant 210-b. As another example, the tenant 205 may be an MSP, and the tenants 210 may be different enterprises/customers (e.g., organizations) of the MSP. The sub-tenant 215-a, the sub-tenant 215-b, and the sub-tenant 215-c may be business units and/or working groups/entities/teams of the enterprises/customers corresponding to the tenant 210-a and the tenant 210-b.

In some examples, the tenant 205 may correspond to a DMS that provides backup and recovery protection to the various tenants 210 and sub-tenants 215 of the organization.

An administrative user of the tenant 205 may access the DMS to configure and allocate resources (e.g., computing objects) that are used to support backup and recovery for data sources associated with the various tenants and sub-tenants. For example, a user may access a user interface of the DMS to create the tenants 210 and assign respective backup and recovery resources to the tenants 210. Assignment of resources to a tenant may include updating metadata (e.g., RBAC metadata) associated with the respective resources to indicate respective tenant or sub-tenant assignments. In some cases, the administrative user may assign, to a tenant or sub-tenant using the user interface of the DMS, a data source that is to be protected using a respective resource, a backup or recovery procedure that may be performed using the respective resource, and/or a storage capacity for the backup and recovery resource. Assignment of a data source, procedure, or capacity may include updating the metadata (e.g., RBAC metadata) associated with the backup and recovery resource (e.g., computing object) that is to be used by the tenant or sub-tenant.

As described herein, users may access a user interface associated with the DMS to control various backup and recovery aspects related to the tenants 205, the tenants 210, and/or the sub-tenants 215. In some examples, the user interface may be supported by a platform or application that is used to manage multiple DMSs, multiple tenants 205, sub-tenants 215, etc. In some examples, an authorized user may access the platform or application to control backup and recovery procedures, as well as tenant or sub-tenant creation and assignment. Each tenant or sub-tenant may be associated with a "context" of the platform or application. An application context refers to a state of an application that allows a user to manage to control aspects of backup and recovery associated with a particular tenant or sub-tenant. Thus, a user may access an application context associated with the tenant 210-a and the user may view resources, procedures, and other items that are assigned to the tenant 210-a, create sub-tenants of the tenant 210-a (e.g. the sub-tenant 215-a and the sub-tenant 215-b), and assign subsets of resources to the created sub-tenants 215. Thus, when discussing a user accessing a user interface of the DMS herein, the user may access the application context associated with a tenant or sub-tenant to perform various functions and procedures described herein.

In some cases, the administrative user may access the user interface of the DMS to assign users to the tenants 210 and/or sub-tenants 215. For example, the administrative user of the tenant 205 may assign a second administrative user to the tenant 210-a such that the second administrative user may access the platform for backup and recovery management, as well as further sub-tenant creation and resource assignment, data source assignment, procedure assignment, and capacity assignment. A third demonstrative user may be similarly assigned to the tenant 210-b. User assignment may be restricted or controlled based on hierarchical techniques, as described herein with respect to computing object assignment.

The DMS may provide an RBAC scheme such that users associated with each tenant/sub-tenant may access only the computing objects assigned to a given tenant/sub-tenant. Accordingly, the tenants 210 and sub-tenants 215 may share a single DMS and/or a single data management cluster without unauthorized access by any tenant 210 or sub-tenant 215 to computing objects or files assigned to a different tenant 210 or sub-tenant 215. For example, one business unit of an enterprise may not access computing objects or files assigned to a different business unit of the enterprise. As another example, one customer of an MSP may not access computing objects or files assigned to a different customer of the MSP.

In accordance with aspects of the present disclosure, the DMS may receive, at a user interface associated with a data management cluster, a federated login request from a user associated with one or more tenants, such as the tenant 210-a and the tenant 210-b. Accordingly, the DMS may redirect the federated login request from the data management cluster to a centralized management service. The DMS may receive, from the centralized management service, a SAML assertion that indicates an identity of the user, a set of object-level permissions assigned to the user, and an identifier of one of the tenants associated with the user, such as the tenant 210-a. The DMS may identify one or more computing objects in the data management cluster that correspond to the tenant 210-a based on the identifier from the SAML assertion. The DMS may determine that the user is authorized to perform a set of actions on the identified computing objects based on the set of object-level permissions indicated by the SAML assertion.

Figure 3:
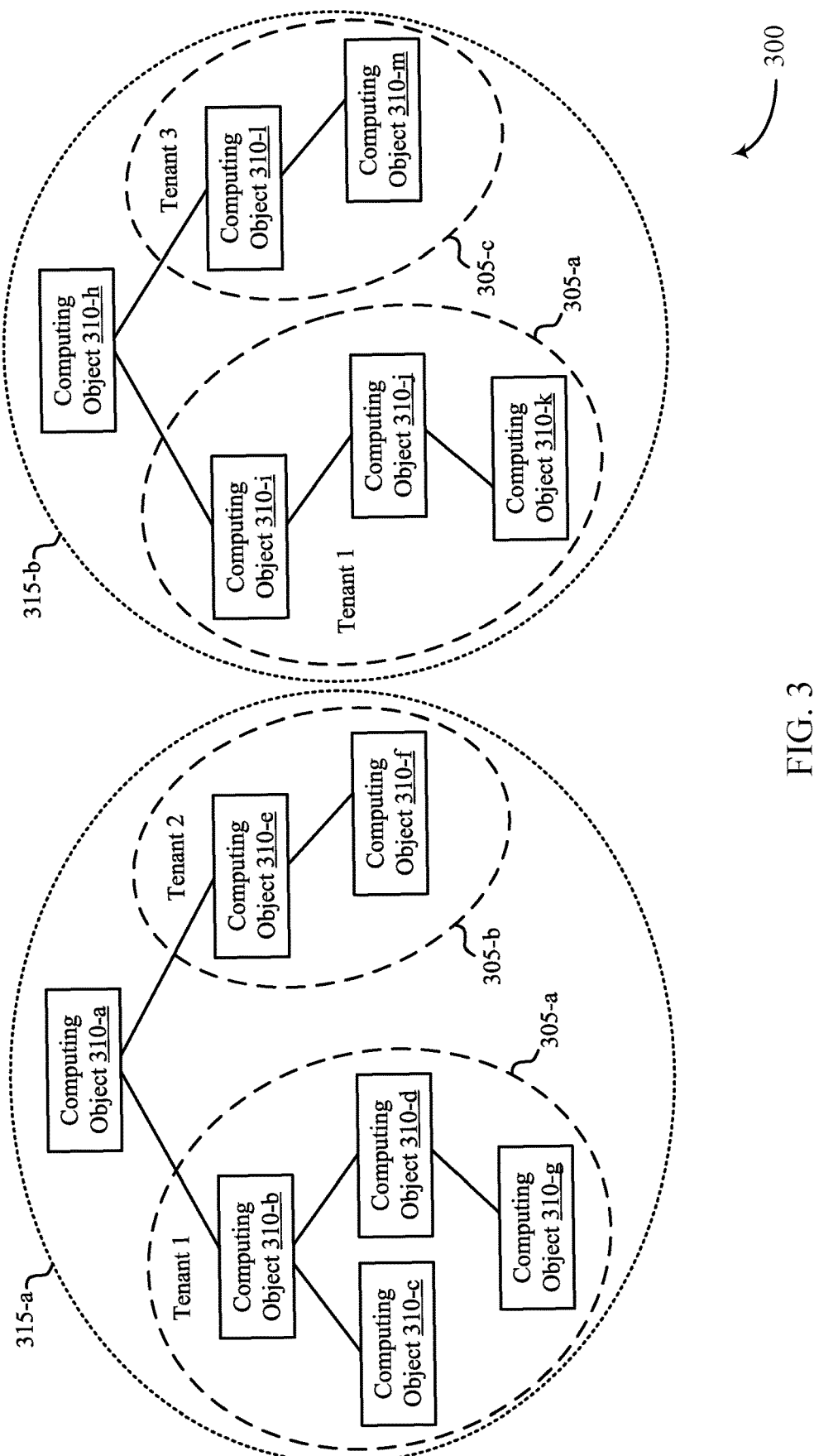
FIG. 3 illustrates an example of a computing object hierarchy that supports federated login mechanisms for multi-tenant RBAC in accordance with aspects of the present disclosure.

FIG. 3 illustrates an example of a computing object hierarchy 300 that supports federated login mechanisms for multi-tenant RBAC in accordance with aspects of the present disclosure. The computing object hierarchy 300 may implement or be implemented by aspects of the computing environment 100 or the multi-tenant system 200. For example, the computing object hierarchy 300 includes a computing object 310-a, a computing object 310-b, a computing object 310-c, a computing object 310-d, a computing object 310-e, a computing object 310-e, a computing object 310-f, a computing object 310-g, a computing object 310-h, a computing object 310-i, a computing object 310-j, a computing object 310-k, a computing object 310-1, and a computing object 310-m, each of which may be an example of one or more components of the DMS 110 described with reference to FIG. 1, such as a virtual machine, a data management cluster, a storage node, etc. The computing objects 310 in the computing object hierarchy 300 may be logically and/or physically separated into a data management cluster 315-a and a data management cluster 315-b.

Each of the data management cluster 315-a and the data management cluster 315-b may include a number of computing objects (e.g., resources such as virtual machines or storage nodes) organized according to hierarchical relationships. For example, the data management cluster 315-a may include the computing object 310-a, which has as descendants the computing object 310-b and the computing object 310-e. The computing object 310-b has as descendants the computing object 310-c and the computing object 310-c, and the computing object 310-d further has as a descendant the computing object 310-g. The computing object 310-e has as a descendent the computing object 310-f.

The data management cluster 315-b may include computing object 310-h, which has as descendants the computing object 310-i and the computing object 310-1. The computing object 310-i has as a descendant the computing object 310-j, and the computing object 310-j further has as a descendant the computing object 310-k. The computing object 310-1 has as a descendent the computing object 310-m.

As described herein, multiple tenants (such as a tenant 305-a, a tenant 305-b, and a tenant 305-c) may share data management resources. More specifically, multiple tenants of a DMS may share computing objects 310 of a same data management cluster. For example, the tenant 305-a and the tenant 305-b may both be assigned computing objects 310 within the data management cluster 315-a, and the tenant 305-a and the tenant 305-c may both be assigned computing objects 310 within the data management cluster 315-b.

The assignment of computing objects 310 of the data management clusters 315 may respect hierarchical relationships among the computing objects 310. For example, assignment of the computing object 310-b to the tenant 305-a may result in assignment of the computing object 310-c, the computing object 310-d, and the computing object 310-g to the tenant 305-a, as the computing object 310-c, the computing object 310-d, and the computing object 310-g are descendants of the computing object 310-b within the computing object hierarchy of the data management cluster 315-a.

Similarly, assignment of the computing object 310-e to the tenant 305-b may result in assignment of the computing object 310-f to the tenant 305-b. As another example, assignment of the computing object 310-i to the tenant 305-a may result in assignment of the computing object 310-j and the computing object 310-k to the tenant 305-a. As another example, assignment of the computing object 310-1 to the tenant 305-c may result in assignment of the computing object 310-m to the tenant 305-c.

As described herein, a DMS (such as the DMS 110 described with reference to FIG. 1) may provide an RBAC scheme such that users associated with each tenant/sub-tenant may access only the computing objects assigned to the given tenant/sub-tenant. For example, a user associated with the tenant 305-a may not access computing objects assigned to the tenant 305-b or the tenant 305-c, a user associated with the tenant 305-b may not access computing objects assigned to the tenant 305-a or the tenant 305-c, and a user associated with the tenant 305-a may not access computing objects assigned to the tenant 305-b or the tenant 305-c.

In accordance with aspects of the present disclosure, the DMS may receive, at a user interface associated with the data management cluster 315-a (also referred to as a cluster of storage nodes), a federated login request from a user associated with one or more of the tenants 305. The DMS may redirect the federated login request from the data management cluster 315-a to a centralized management service (such as the centralized management service 405 described with reference to FIG. 4). The DMS may receive, from the centralized management service, a SAML assertion that indicates an identity of the user, a set of object-level permissions assigned to the user, and an identifier of one of the tenants 305, such as the tenant 305-a. The DMS may identify one or more computing objects 310 in the data management cluster 315-a that correspond to the tenant 305-a (such as the computing object 310-b) based on the identifier from the SAML assertion. The DMS may determine that the user is authorized to perform a set of actions on the identified computing objects 310 based on the set of object-level permissions indicated by the SAML assertion.

Figure 4:
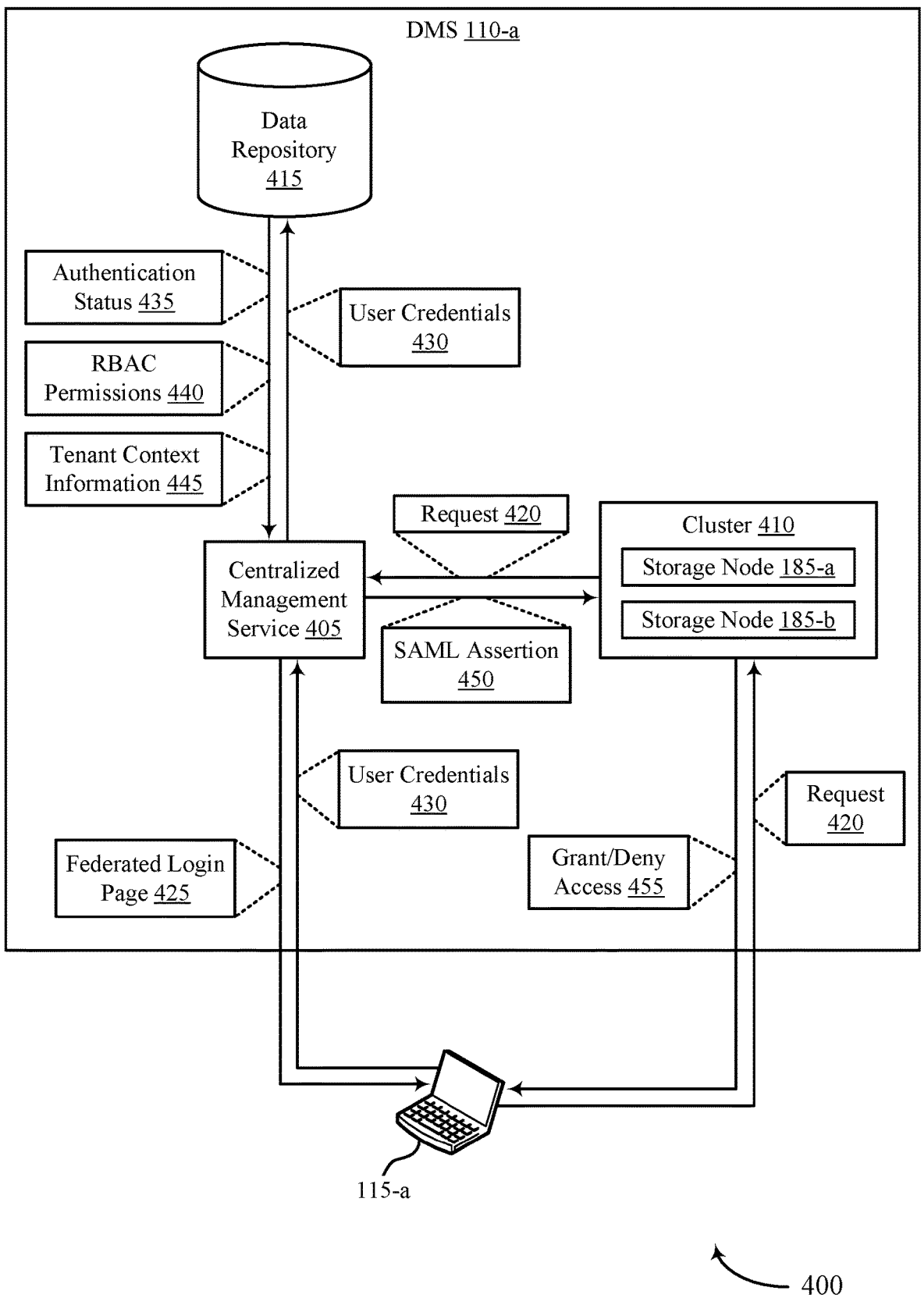
FIG. 4 illustrates an example of a computing environment that supports federated login mechanisms for multi-tenant RBAC in accordance with aspects of the present disclosure.

FIG. 4 illustrates an example of a computing environment 400 that supports federated login mechanisms for multi-tenant RBAC in accordance with aspects of the present disclosure. The computing environment 400 may implement or be implemented by aspects of the computing environment 100, the multi-tenant system 200, or the computing object hierarchy 300. For example, the computing environment 400 includes a DMS 110-a and a computing device 115-a, which may be examples of corresponding systems and devices described with reference to FIGS. 1 through 3. The computing environment 400 also includes a cluster 410 (also referred to herein as a data management cluster, a CDM cluster, or an on-premise cluster) and a centralized management service 405, both of which may operate across a variety of virtual and/or physical computing resources in the DMS 110-a.

As described herein, multi-tenant RBAC can be used to improve access control for a multi-tenancy DMS (such as the DMS 110-a) that has resources across cloud platforms and on-premise data center clusters (such as the cluster 410). The techniques described herein support using multi-tenant RBAC for users logging into the cluster 410 via federated login, such that federated login users cannot perform unauthorized operations via a federated login session. The federated login mechanisms disclosed herein support in-depth RBAC enforcement. A user associated with a tenant of the DMS 110-a (such as the tenant 210-a described with reference to FIG. 2) cannot bypass access control enforcement on the control plane side (i.e., while interacting with the centralized management service 405) or the cluster side (i.e., while interacting with the cluster 410) via federated login. Dashboards, events, audits, and reports are all enforced with access control in-depth for both control plane and on-premise clusters.

In accordance with the multi-tenancy federated login mechanisms described herein, the centralized management service 405 may populate tenant login context (with authorization context) for users of the centralized management service 405 from sessions in the cluster 410. To make federated login sessions tenant-aware (such that the cluster 410 has access to tenant organization context from the centralized management service 405), the centralized management service 405 may insert a tenant organization identifier and translated object-level authorization details into a SAML assertion 450. As a result, the cluster 410 (e.g., CDM cluster) is able to distinguish federated login sessions of the same user for different tenants. The translated authorization details (e.g., object-level user permissions) are associated with each tenant-specific session at the cluster 410.

To distinguish audits generated by users from different organization contexts, the centralized management service 405 may pass an organization identifier and name (also referred to as a tenant identifier or tenant-specific context information) to the cluster 410 via the SAML assertion 450, such that the cluster 410 can generate tenant-specific audit logs. For example, the cluster 410 may generate the following audit log for a user from a first organization ("org1"):

TABLE 1

Tenant-Specific Audit Log

| User Type | Username |
| --- | --- |
| LDAP User | JazLin [LDAP] (org1) |
| SSO User | JazLin [SSO] (org1) |
| Local User | JazLin [Local] (org1) |

The techniques described herein may also support tenant-aware live mount operations. As described herein, live mount generally refers to the process of a duplicating or otherwise copying the contents of a data source (such as a virtual machine or a database) onto a computing object within the DMS 110-a. As an example, a user may perform a live mount operation after using federated login to access the cluster 410. In some cases, the user may create the live mount under a first organizational context (org1) and then login to the cluster 410 under a different organizational context (org2). To ensure that multi-tenant RBAC is adhered to, the federated-login user may be limited to viewing and/or managing live mounts created under the specific organization login context. As such, the live mount created in org1 may not be viewable or manageable when the user logins under org2.

In the example of FIG. 4, the computing device 115-*a* may transmit a request 420 to access or view one or more resources of the cluster 410, such as a storage node 185-*a* or a storage node 185-*b*. Upon receiving the request from the computing device 115-*a*, the cluster 410 (e.g., the service provider) may redirect the request 420 to the centralized management service 405 (e.g., the identity provider), which may in turn direct the computing device 115-*a* to a federated login page 425 of the DMS 110-*a*. Accordingly, a user of the computing device 115-*a* may enter or otherwise provide some form of user credentials 430, which may be passed back to the centralized management service 405.

The centralized management service 405 may check the user credentials 430 provided by the user of the computing device 115-*a* to determine an authentication status 435 of the user (e.g., authorized or unauthorized). if the user credentials 430 are valid, the centralized management service 405 may retrieve a set of RBAC permissions 440 and tenant context information 445 associated with the user credentials 430. The set of RBAC permissions 440 may identify a set of computing objects (such as virtual machines or data centers in the cluster 410) the user is authorized to access and a set of actions the user is authorized to perform on said computing objects. The tenant context information may identify a specific tenant organization to which the request 420 corresponds (i.e., the tenant organization to which the user is attempting to login).

Thereafter, the centralized management service 405 may translate the set of RBAC permissions 440 into object-level authorization information and embed both the tenant context information 445 and the translated object-level authorization information into a SAML assertion 450. Accordingly, the centralized management service 405 may pass the SAML assertion 450 back to the cluster 410. Embedding object-level authorization information and tenant-specific context information into the SAML assertion 450 may enable the cluster 410 (and all other sub-systems of the DMS 110-*a*) to ensure that multi-tenant RBAC is properly enforced. Upon receiving the SAML assertion 450 from the centralized management service 405, the cluster 410 may determine whether to grant or deny access to the user at 455 based on the information embedded in the SAML assertion 450.

Figure 5:
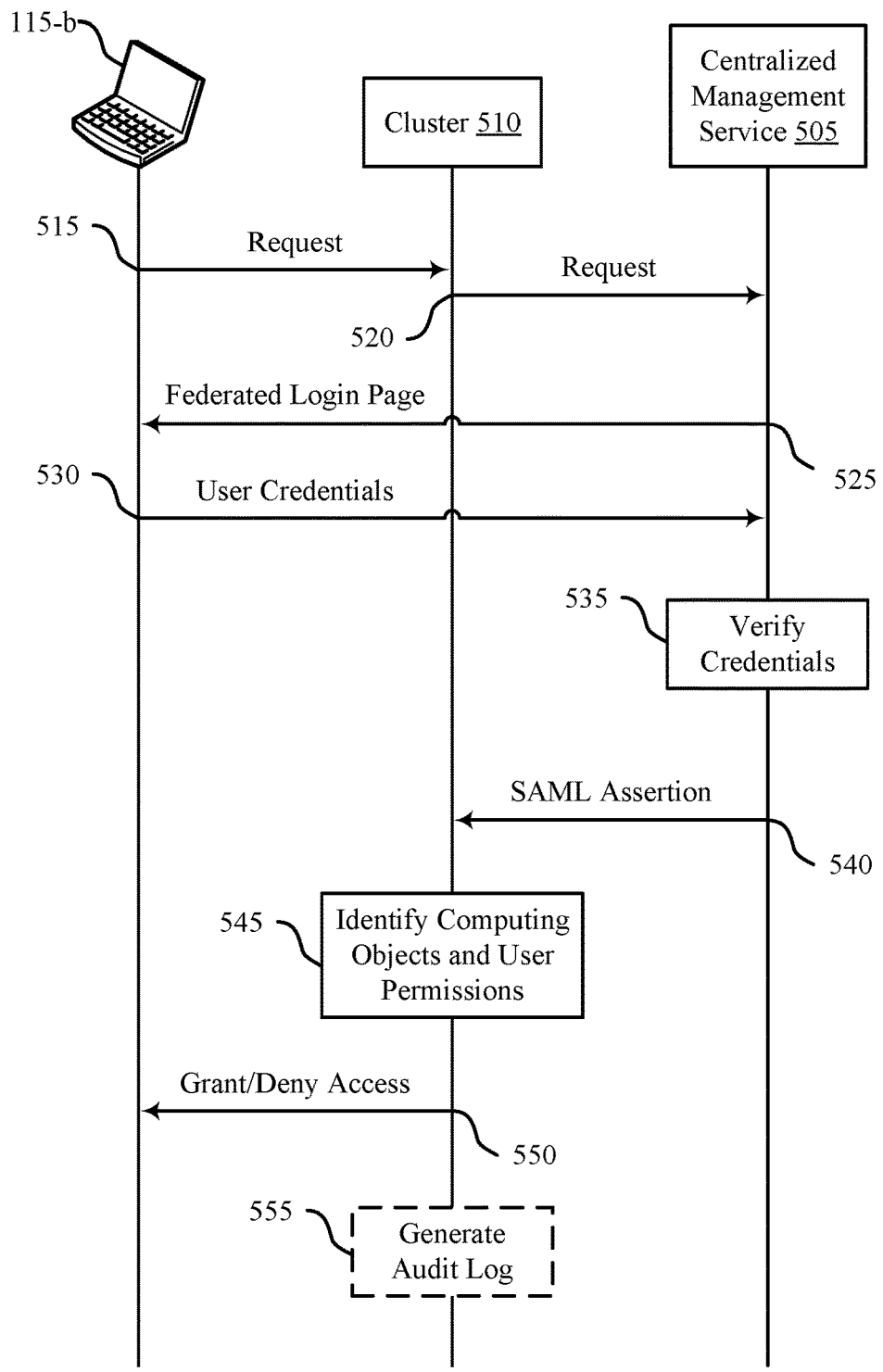
FIG. 5 illustrates an example of a process flow that supports federated login mechanisms for multi-tenant RBAC in accordance with aspects of the present disclosure.

FIG. 5 illustrates an example of a process flow 500 that supports federated login mechanisms for multi-tenant RBAC in accordance with aspects of the present disclosure. The process flow 500 may implement or be implemented by aspects of any of the computing environments, multi-tenant systems, or computing object hierarchies described with reference to FIGS. 1 through 4. For example, the process flow 500 includes a computing device 115-*b*, a cluster 510, and a centralized management service 505, which may be examples of corresponding devices and services described with reference to FIGS. 1 through 4. In the following description of the process flow 500, operations between the computing device 115-*b*, the centralized management service 505, and the cluster 510 may be added, omitted, or performed in a different order (with respect to the exemplary order shown).

At 515, a user of the computing device 115-*b* may request to access the cluster 510 (equivalently referred to herein as a CDM cluster or a data management cluster), for example, by navigating to a specific uniform resource locator (URL) in a user interface of the computing device 115-*b*. As described herein, the cluster 510 may include one or more computing objects (such as virtual machines or data centers) and/or storage nodes (such as the storage nodes 185 described with reference to FIG. 1).

At 520, the cluster 510 may redirect the request from the user to the centralized management service 505. At 525, the centralized management service 505 may direct the computing device 115-*b* to a federated login page associated with the centralized management service 505. The federated login page may prompt the user to enter appropriate credentials, such as a username, password, passkey, biometric, etc. At 530, the user may provide the requested credentials by interacting with one or more interfaces and/or components of the computing device 115-*b*.

At 535, the centralized management service 505 may compare the credentials provided by the user to account information that is locally accessible to the centralized management service 505. For example, the centralized management service 505 may retrieve account details from a data repository (such as the data repository 415 described with reference to FIG. 4) and compare the retrieved account details to the credentials provided by the user. If the credentials are valid, the centralized management service 505 use the retrieved account details and metadata from the login request to determine object-level authorization information for the user and tenant-specific context information for the login request.

Accordingly, the centralized management service 505 may embed the object-level authorization information and the tenant-specific context information into a SAML 2.0 assertion, which the centralized management service 505 may pass back to the cluster 510 at 540. The object-level authorization information may indicate, for example, a set of computing objects (i.e., virtual machines, virtual data centers, storage nodes) the user is authorized to access and a set of actions (i.e., read, write) the user can perform on the set of computing objects. The tenant-specific context information may indicate an identifier of a tenant associated with the login request. In some examples, the tenant-specific context information may determine which computing objects the user is permitted to access and/or which actions the user is authorized to perform on said computing objects.

At 545, the cluster 510 may identify one or more computing objects in the cluster 510 that correspond to the tenant identifier from the tenant-specific context information embedded in the SAML 2.0 assertion. Likewise, the cluster 510 may determine that the user is authorized to perform a set of actions on the one or more computing objects based on the object-level authorization information embedded in the SAML 2.0 assertion.

At 550, the cluster 510 may grant or deny access to the resources requested by the user. If the user is not authorized to access or view the resources indicated by the login request (as indicated by the SAML 2.0 assertion), the cluster 510 may deny the request and transmit a notification to the computing device 115-*b*. For example, if the user attempts to access or view a live mount that is associated with a different login context (i.e., a different tenant organization), the cluster 510 may prevent the user from accessing the live mount, even if the live mount was created by the same user. In contrast, if the user is authorized to access or view the resources indicated by the request, the cluster 510 may redirect the computing device 115-*b* to an interface (such as a webpage) that provides the user with access to the requested resources and data.

In some examples, the cluster 510 may generate or update a tenant-aware audit log at 555. The tenant-aware audit log may include various entries corresponding to federated login requests/attempts from different users. Each entry of the tenant-aware audit log may include an identifier of the user, an authentication protocol associated with the federated login attempt (i.e., Auth0, LDAP, SSO, local), an identifier of the sub-system and/or resource(s) accessed, a timestamp associated with the federated login attempt, tenant-specific context information associated with the federated login request, etc.

Figure 6:
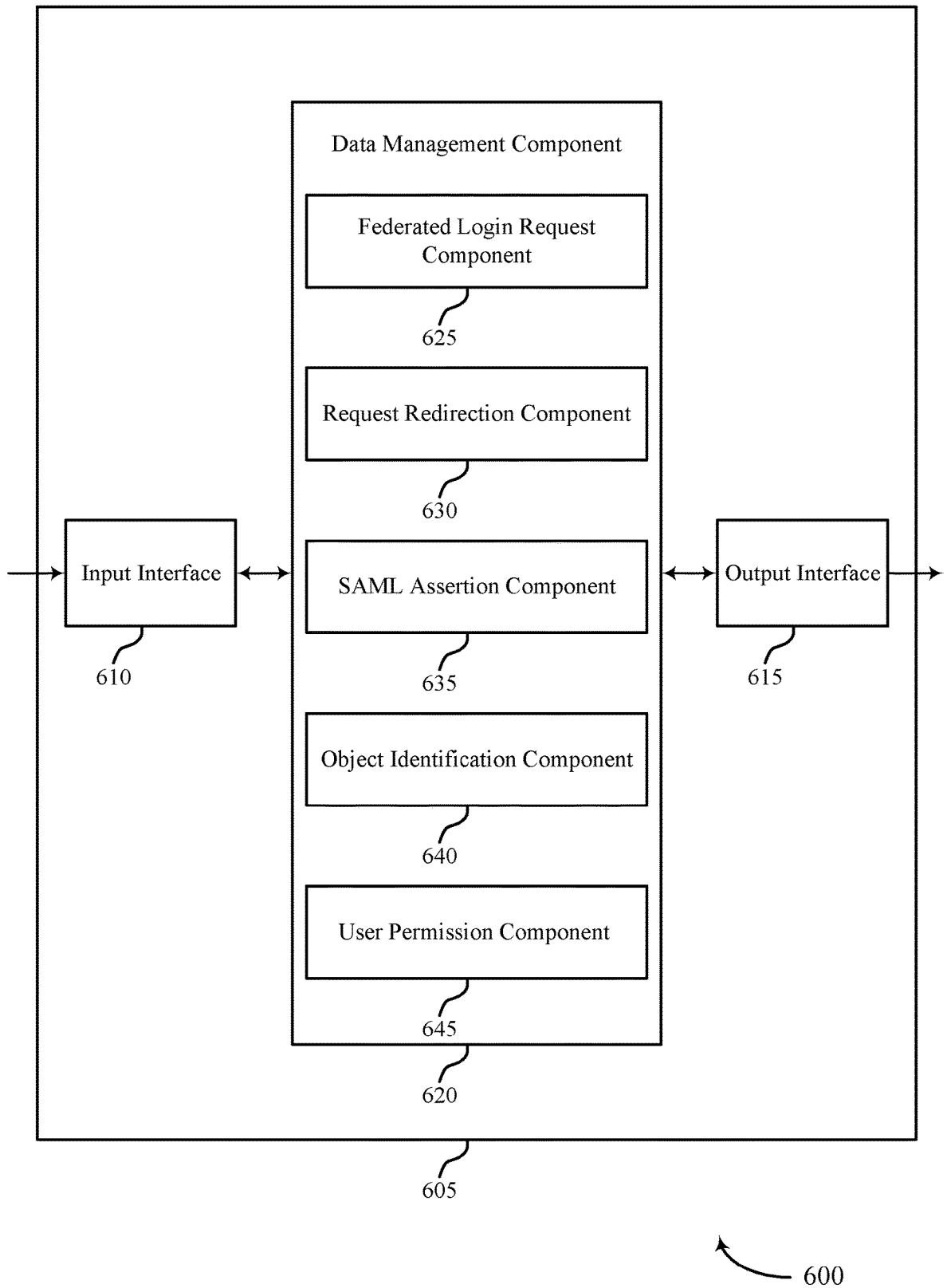
FIG. 6 illustrates a block diagram of an apparatus that supports federated login mechanisms for multi-tenant RBAC in accordance with aspects of the present disclosure.

FIG. 6 illustrates a block diagram 600 of a system 605 that supports federated login mechanisms for multi-tenant RBAC in accordance with aspects of the present disclosure. In some examples, the system 605 may be an example of aspects of one or more components described with reference to FIG. 1, such as a DMS 110. The system 605 may include an input interface 610, an output interface 615, and a data management component 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the data management component 620 to support federated login mechanisms for multi-tenant RBAC. In some cases, the input interface 610 may be a component of a network interface 825, as described with reference to FIG. 8.

The output interface 615 may manage output signaling for the system 605. For example, the output interface 615 may receive signaling from other components of the system 605, such as the data management component 620, and may transmit such output signaling corresponding to (e.g., representative of or otherwise based on) such signaling to other systems or devices. In some cases, the output interface 615 may be a component of a network interface 825, as described with reference to FIG. 8.

For example, the data management component 620 may include a federated login request component 625, a request redirection component 630, an SAML assertion component 635, an object identification component 640, a user permission component 645, or any combination thereof. In some examples, the data management component 620, or various components thereof, may be configured to perform various operations (e.g., receiving, monitoring, transmitting) using or otherwise in cooperation with the input interface 610, the output interface 615, or both. For example, the data management component 620 may receive information from the input interface 610, send information to the output interface 615, or be integrated in combination with the input interface 610, the output interface 615, or both to receive information, transmit information, or perform various other operations as described herein.

The data management component 620 may support data management in accordance with examples disclosed herein. The federated login request component 625 may be configured as or otherwise support a means for receiving, at a user interface associated with a cluster of storage nodes in a DMS, a federated login request from a user associated with one or more tenants of the DMS. The request redirection component 630 may be configured as or otherwise support a means for redirecting, by the DMS, the federated login request from the cluster of storage nodes to a centralized management service for the DMS. The SAML assertion component 635 may be configured as or otherwise support a means for receiving, from the centralized management service, a SAML assertion that indicates an identity of the user, a set of object-level permissions assigned to the user, and an identifier of a first tenant of the one or more tenants associated with the user. The object identification component 640 may be configured as or otherwise support a means for identifying, by the DMS, one or more computing objects in the cluster of storage nodes that correspond to the first tenant based on the identifier from the SAML assertion. The user permission component 645 may be configured as or otherwise support a means for determining, by the DMS, that the user is authorized to perform a set of actions on the one or more computing objects based on the set of object-level permissions indicated by the SAML assertion.

Figure 7:
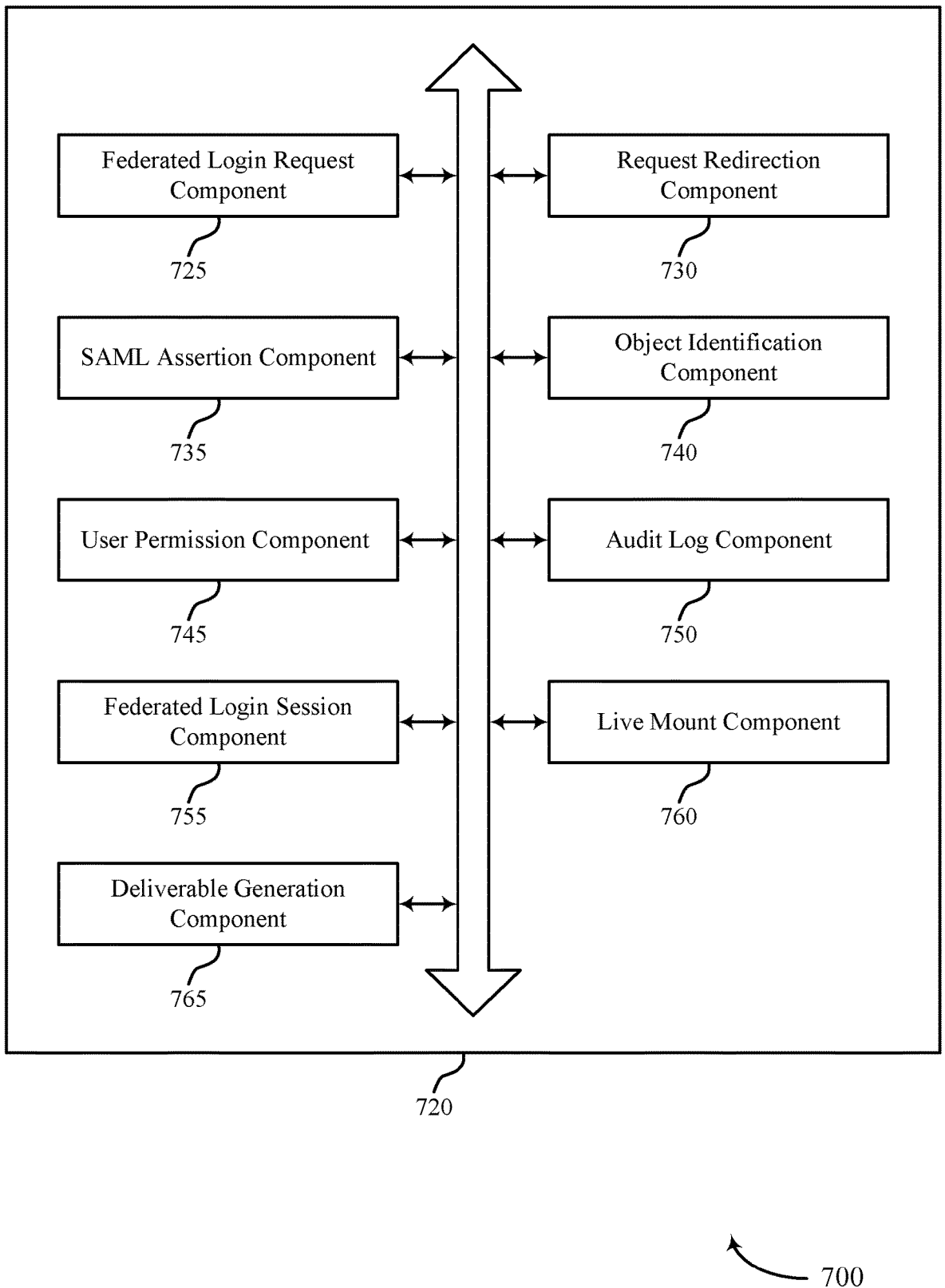
FIG. 7 illustrates a block diagram of a data management component that supports federated login mechanisms for multi-tenant RBAC in accordance with aspects of the present disclosure.

FIG. 7 illustrates a block diagram 700 of a data management component 720 that supports federated login mechanisms for multi-tenant RBAC in accordance with aspects of the present disclosure. The data management component 720 may be an example of aspects of a data management component or a data management component 620, or both, as described herein. The data management component 720, or various components thereof, may be an example of means for performing various aspects of federated login mechanisms for multi-tenant RBAC as described herein. For example, the data management component 720 may include a federated login request component 725, a request redirection component 730, an SAML assertion component 735, an object identification component 740, a user permission component 745, an audit log component 750, a federated login session component 755, a live mount component 760, a deliverable generation component 765, or any combination thereof. Each of these components may communicate, directly or indirectly, with one another (e.g., via one or more buses, communications links, communications interfaces, or any combination thereof).

The data management component 720 may support data management in accordance with examples disclosed herein. The federated login request component 725 may be configured as or otherwise support a means for receiving, at a user interface associated with a cluster of storage nodes in a DMS, a federated login request from a user associated with one or more tenants of the DMS. The request redirection component 730 may be configured as or otherwise support a means for redirecting, by the DMS, the federated login request from the cluster of storage nodes to a centralized management service for the DMS. The SAML assertion component 735 may be configured as or otherwise support a means for receiving, from the centralized management service, a SAML assertion that indicates an identity of the user, a set of object-level permissions assigned to the user, and an identifier of a first tenant of the one or more tenants associated with the user. The object identification component 740 may be configured as or otherwise support a means for identifying, by the DMS, one or more computing objects in the cluster of storage nodes that correspond to the first tenant based on the identifier from the SAML assertion. The user permission component 745 may be configured as or otherwise support a means for determining, by the DMS, that the user is authorized to perform a set of actions on the one or more computing objects based on the set of object-level permissions indicated by the SAML assertion.

In some examples, the audit log component 750 may be configured as or otherwise support a means for generating, by the DMS, an audit log that indicates an authentication protocol associated with the federated login request, an identifier of the user associated with the federated login request, and the identifier of the first tenant associated with the user.

In some examples, the audit log includes multiple entries corresponding to previous federated login sessions between the user and the DMS. In some examples, at least one entry in the audit log corresponds to a second tenant of the DMS and includes an identifier of the second tenant.

In some examples, the federated login session component 755 may be configured as or otherwise support a means for establishing, by the DMS, a federated login session between the DMS and the user in accordance with the federated login request, where the user is unable to perform unauthorized actions or access data associated with tenants other than the first tenant during the federated login session.

In some examples, the live mount component 760 may be configured as or otherwise support a means for determining, by the DMS, whether the user is authorized to access a live mount of a computing system (e.g., one or more databases or virtual machines) based on tenant-specific context information associated with the federated login request and tenant-specific context information associated with the live mount of the computing system.

In some examples, the live mount of the computing system is inaccessible to the user if the tenant-specific context information associated with the federated login request is different from the tenant-specific context information associated with the live mount of the computing system.

In some examples, the deliverable generation component 765 may be configured as or otherwise support a means for generating, by the DMS, a deliverable that includes data associated with the first tenant of the DMS. In some examples, the deliverable generation component 765 may be configured as or otherwise support a means for causing, by the DMS, the deliverable to be displayed in the user interface according to the set of object-level permissions assigned to the user. In some examples, the deliverable includes a dashboard, an event log, an audit log, a report, or any combination thereof.

In some examples, the first tenant is an MSP that manages data for multiple sub-tenants below the first tenant within a hierarchy of tenants for the DMS. In some examples, the set of object-level permissions indicated by the SAML assertion correspond to tenant-specific RBAC permissions assigned to the user. In some examples, the centralized management service is operable to manage data protection services for data sources associated with multiple tenants of the DMS.

Figure 8:
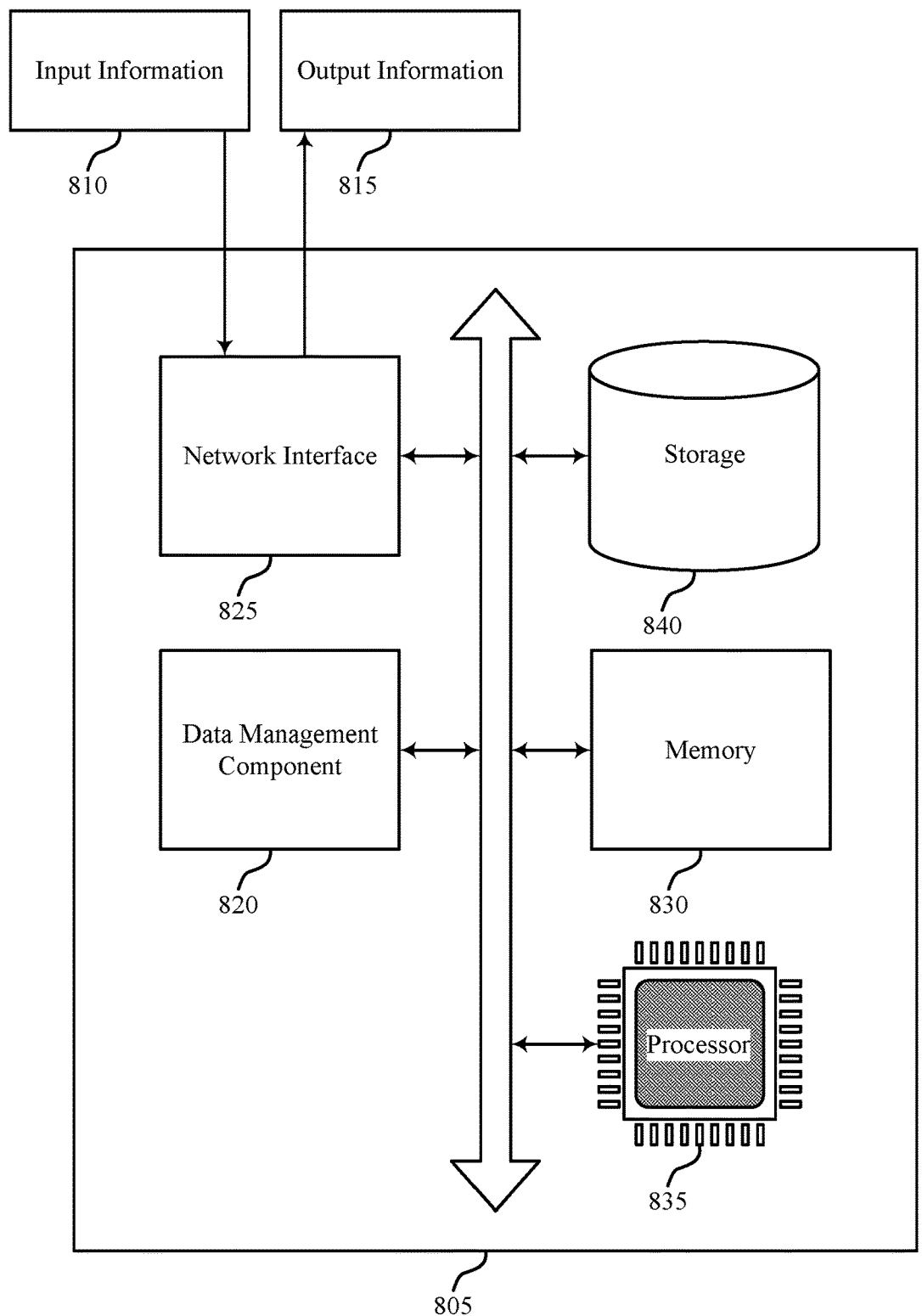
FIG. 8 illustrates a diagram of a system including a device that supports federated login mechanisms for multi-tenant RBAC in accordance with aspects of the present disclosure.

FIG. 8 illustrates a block diagram 800 of a system 805 that supports federated login mechanisms for multi-tenant RBAC in accordance with aspects of the present disclosure. The system 805 may be an example of or include the components of a system 605 as described herein. The system 805 may include components for data management, including components such as a data management component 820, an input information 810, an output information 815, a network interface 825, a memory 830, a processor 835, and a storage 840. These components may be in electronic communication or otherwise coupled with each other (e.g., operatively, communicatively, functionally, electronically, electrically; via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting federated login mechanisms for multi-tenant RBAC). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. In some cases, the processor 835 may be an example of aspects of one or more components described with reference to FIG. 1, such as one or more processors 170.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1, such as one or more network disks 180.

The data management component 820 may support data management in accordance with examples disclosed herein. For example, the data management component 820 may be configured as or otherwise support a means for receiving, at a user interface associated with a cluster of storage nodes in a DMS, a federated login request from a user associated with one or more tenants of the DMS. The data management component 820 may be configured as or otherwise support a means for redirecting, by the DMS, the federated login request from the cluster of storage nodes to a centralized management service for the DMS. The data management component 820 may be configured as or otherwise support a means for receiving, from the centralized management service, a SAML assertion that indicates an identity of the user, a set of object-level permissions assigned to the user, and an identifier of a first tenant of the one or more tenants associated with the user. The data management component 820 may be configured as or otherwise support a means for identifying, by the DMS, one or more computing objects in the cluster of storage nodes that correspond to the first tenant based on the identifier from the SAML assertion. The data management component 820 may be configured as or otherwise support a means for determining, by the DMS, that the user is authorized to perform a set of actions on the one or more computing objects based on the set of object-level permissions indicated by the SAML assertion.

By including or configuring the data management component 820 in accordance with examples as described herein, the system 805 may support federated login mechanisms for multi-tenant RBAC, which may provide one or more benefits such as, for example, improved user experience and enhanced multi-tenant RBAC enforcement, among other possibilities.

Figure 9:
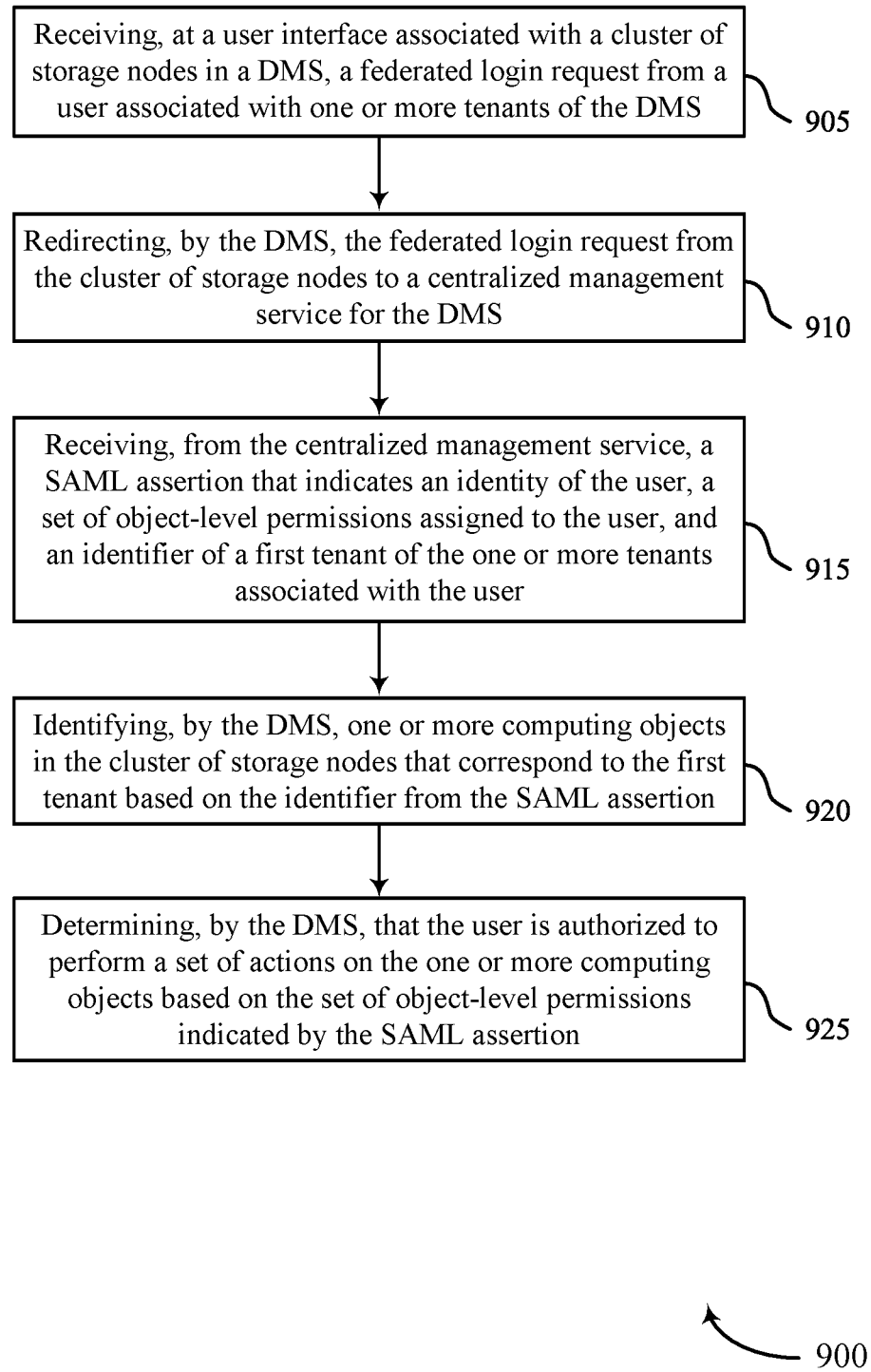
FIGS. 9 through 11 illustrate flowcharts showing methods that support federated login mechanisms for multi-tenant RBAC in accordance with aspects of the present disclosure.

FIG. 9 illustrates a flowchart showing a method 900 that supports federated login mechanisms for multi-tenant RBAC in accordance with aspects of the present disclosure. The operations of the method 900 may be implemented by a DMS or components thereof. For example, the operations of the method 900 may be performed by a DMS 110, as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include receiving, at a user interface associated with a cluster of storage nodes in a DMS, a federated login request from a user associated with one or more tenants of the DMS. The operations of 905 may be performed in accordance with examples disclosed herein. In some examples, aspects of the operations of 905 may be performed by a federated login request component 725, as described with reference to FIG. 7.

At 910, the method may include redirecting, by the DMS, the federated login request from the cluster of storage nodes to a centralized management service for the DMS. The operations of 910 may be performed in accordance with examples disclosed herein. In some examples, aspects of the operations of 910 may be performed by a request redirection component 730, as described with reference to FIG. 7.

At 915, the method may include receiving, from the centralized management service, a SAML assertion that indicates an identity of the user, a set of object-level permissions assigned to the user, and an identifier of a first tenant of the one or more tenants associated with the user. The operations of 915 may be performed in accordance with examples disclosed herein. In some examples, aspects of the operations of 915 may be performed by an SAML assertion component 735, as described with reference to FIG. 7.

At 920, the method may include identifying, by the DMS, one or more computing objects in the cluster of storage nodes that correspond to the first tenant based on the identifier from the SAML assertion. The operations of 920 may be performed in accordance with examples disclosed herein. In some examples, aspects of the operations of 920 may be performed by an object identification component 740, as described with reference to FIG. 7.

At 925, the method may include determining, by the DMS, that the user is authorized to perform a set of actions on the one or more computing objects based on the set of object-level permissions indicated by the SAML assertion. The operations of 925 may be performed in accordance with examples disclosed herein. In some examples, aspects of the operations of 925 may be performed by a user permission component 745, as described with reference to FIG. 7.

Figure 10:
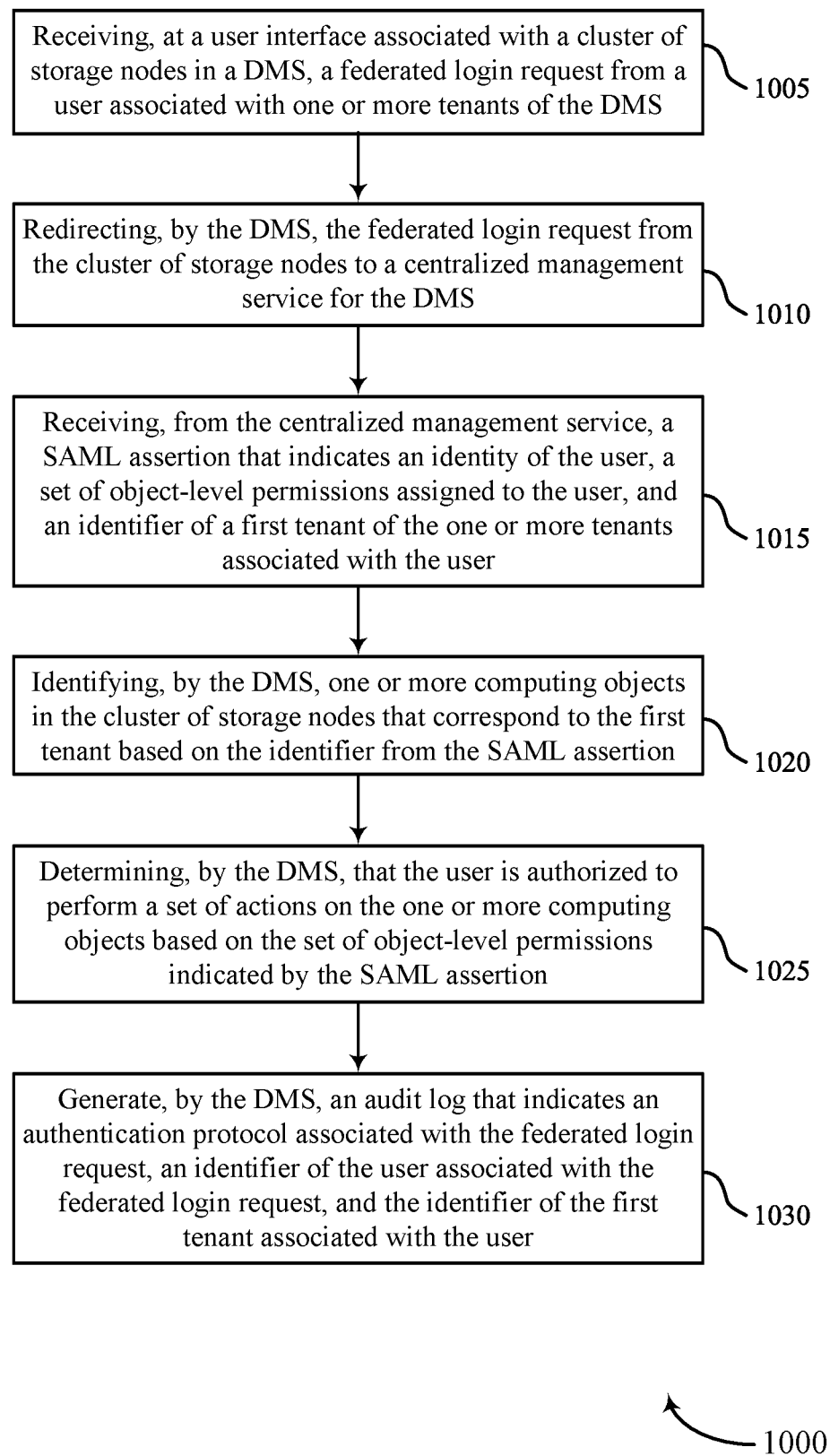

FIG. 10 illustrates a flowchart showing a method 1000 that supports federated login mechanisms for multi-tenant RBAC in accordance with aspects of the present disclosure. The operations of the method 1000 may be implemented by a DMS or components thereof. For example, the operations of the method 1000 may be performed by a DMS 110, as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include receiving, at a user interface associated with a cluster of storage nodes in a DMS, a federated login request from a user associated with one or more tenants of the DMS. The operations of 1005 may be performed in accordance with examples disclosed herein. In some examples, aspects of the operations of 1005 may be performed by a federated login request component 725, as described with reference to FIG. 7.

At 1010, the method may include redirecting, by the DMS, the federated login request from the cluster of storage nodes to a centralized management service for the DMS. The operations of 1010 may be performed in accordance with examples disclosed herein. In some examples, aspects of the operations of 1010 may be performed by a request redirection component 730, as described with reference to FIG. 7.

At 1015, the method may include receiving, from the centralized management service, a SAML assertion that indicates an identity of the user, a set of object-level permissions assigned to the user, and an identifier of a first tenant of the one or more tenants associated with the user. The operations of 1015 may be performed in accordance with examples disclosed herein. In some examples, aspects of the operations of 1015 may be performed by an SAML assertion component 735, as described with reference to FIG. 7.

At 1020, the method may include identifying, by the DMS, one or more computing objects in the cluster of storage nodes that correspond to the first tenant based on the identifier from the SAML assertion. The operations of 1020 may be performed in accordance with examples disclosed herein. In some examples, aspects of the operations of 1020 may be performed by an object identification component 740, as described with reference to FIG. 7.

At 1025, the method may include determining, by the DMS, that the user is authorized to perform a set of actions on the one or more computing objects based on the set of object-level permissions indicated by the SAML assertion. The operations of 1025 may be performed in accordance with examples disclosed herein. In some examples, aspects of the operations of 1025 may be performed by a user permission component 745, as described with reference to FIG. 7.

At 1030, the method may include generating, by the DMS, an audit log that indicates an authentication protocol associated with the federated login request, an identifier of the user associated with the federated login request, and the identifier of the first tenant associated with the user. The operations of 1030 may be performed in accordance with examples disclosed herein. In some examples, aspects of the operations of 1030 may be performed by an audit log component 750, as described with reference to FIG. 7.

Figure 11:
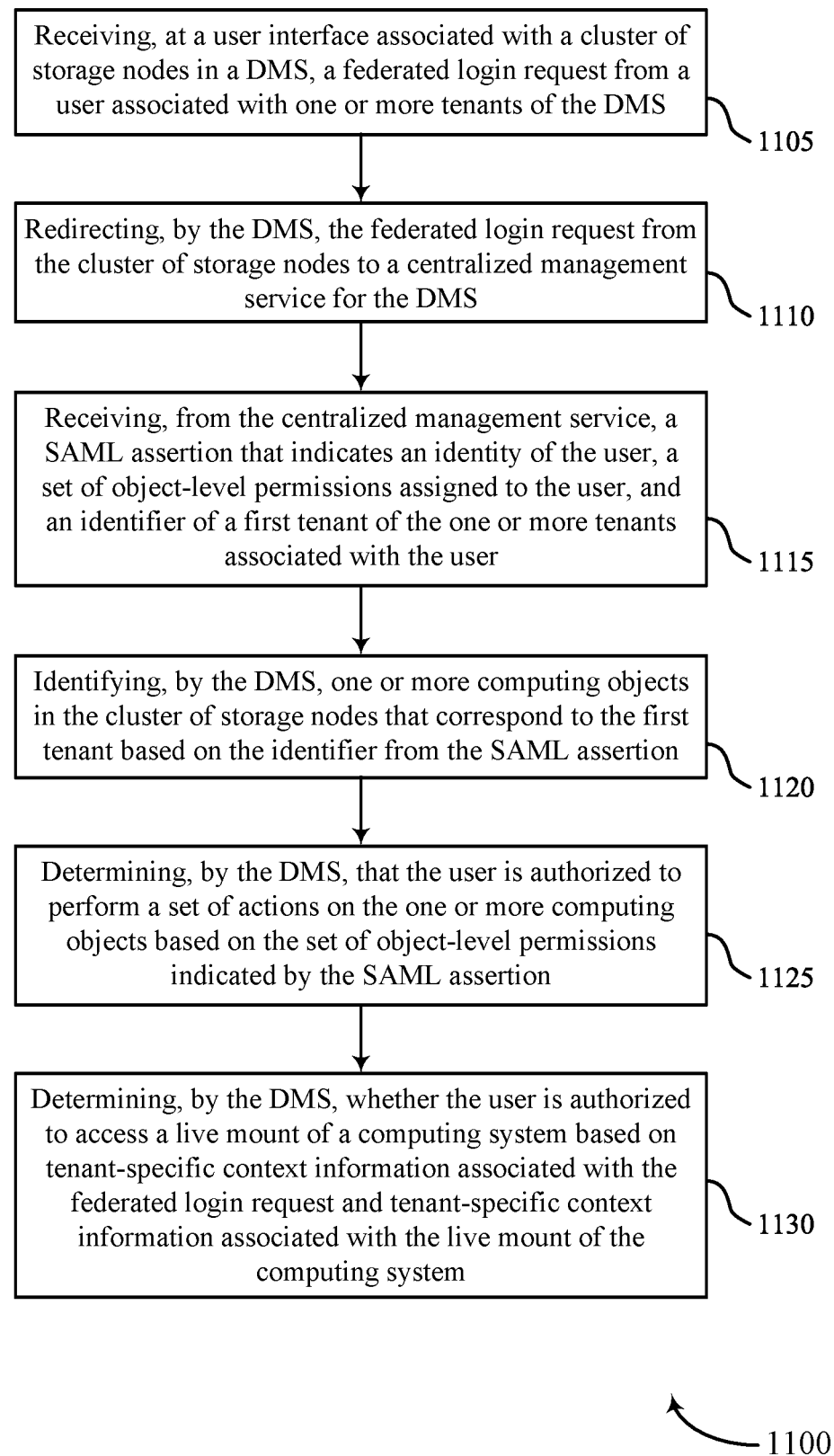

FIG. 11 illustrates a flowchart showing a method 1100 that supports federated login mechanisms for multi-tenant RBAC in accordance with aspects of the present disclosure. The operations of the method 1100 may be implemented by a DMS or components thereof. For example, the operations of the method 1100 may be performed by a DMS 110, as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1105, the method may include receiving, at a user interface associated with a cluster of storage nodes in a DMS, a federated login request from a user associated with one or more tenants of the DMS. The operations of 1105 may be performed in accordance with examples disclosed herein. In some examples, aspects of the operations of 1105 may be performed by a federated login request component 725, as described with reference to FIG. 7.

At 1110, the method may include redirecting, by the DMS, the federated login request from the cluster of storage nodes to a centralized management service for the DMS. The operations of 1110 may be performed in accordance with examples disclosed herein. In some examples, aspects of the operations of 1110 may be performed by a request redirection component 730, as described with reference to FIG. 7.

At 1115, the method may include receiving, from the centralized management service, a SAML assertion that indicates an identity of the user, a set of object-level permissions assigned to the user, and an identifier of a first tenant of the one or more tenants associated with the user. The operations of 1115 may be performed in accordance with examples disclosed herein. In some examples, aspects of the operations of 1115 may be performed by an SAML assertion component 735, as described with reference to FIG. 7.

At 1120, the method may include identifying, by the DMS, one or more computing objects in the cluster of storage nodes that correspond to the first tenant based on the identifier from the SAML assertion. The operations of 1120 may be performed in accordance with examples disclosed herein. In some examples, aspects of the operations of 1120 may be performed by an object identification component 740, as described with reference to FIG. 7.

At 1125, the method may include determining, by the DMS, that the user is authorized to perform a set of actions on the one or more computing objects based on the set of object-level permissions indicated by the SAML assertion. The operations of 1125 may be performed in accordance with examples disclosed herein. In some examples, aspects of the operations of 1125 may be performed by a user permission component 745, as described with reference to FIG. 7.

At 1130, the method may include determining, by the DMS, whether the user is authorized to access a live mount of a computing system (e.g., one or more databases or virtual machines) based on tenant-specific context information associated with the federated login request and tenant-specific context information associated with the live mount of the computing system. The operations of 1130 may be performed in accordance with examples disclosed herein. In some examples, aspects of the operations of 1130 may be performed by a live mount component 760, as described with reference to FIG. 7.

A method for data management is described. The method may include receiving, at a user interface associated with a cluster of storage nodes in a DMS, a federated login request from a user associated with one or more tenants of the DMS. The method may further include redirecting, by the DMS, the federated login request from the cluster of storage nodes to a centralized management service for the DMS. The method may further include receiving, from the centralized management service, a SAML assertion that indicates an identity of the user, a set of object-level permissions assigned to the user, and an identifier of a first tenant of the one or more tenants associated with the user. The method may further include identifying, by the DMS, one or more computing objects in the cluster of storage nodes that correspond to the first tenant based on the identifier from the SAML assertion. The method may further include determining, by the DMS, that the user is authorized to perform a set of actions on the one or more computing objects based on the set of object-level permissions indicated by the SAML assertion.

A DMS is described. The DMS may include a processor, memory coupled with the processor, and instructions stored in the memory. The instructions may be executable by the processor to cause the DMS to receive, at a user interface associated with a cluster of storage nodes in the DMS, a federated login request from a user associated with one or more tenants of the DMS. The instructions may be further executable by the processor to cause the DMS to redirect the federated login request from the cluster of storage nodes to a centralized management service for the DMS. The instructions may be further executable by the processor to cause the DMS to receive, from the centralized management service, a SAML assertion that indicates an identity of the user, a set of object-level permissions assigned to the user, and an identifier of a first tenant of the one or more tenants associated with the user. The instructions may be further executable by the processor to cause the DMS to identify one or more computing objects in the cluster of storage nodes that correspond to the first tenant based on the identifier from the SAML assertion. The instructions may be further executable by the processor to cause the DMS to determine that the user is authorized to perform a set of actions on the one or more computing objects based on the set of object-level permissions indicated by the SAML assertion.

An apparatus for data management is described. The apparatus may include means for receiving, at a user interface associated with a cluster of storage nodes in a DMS, a federated login request from a user associated with one or more tenants of the DMS. The apparatus may further include means for redirecting, by the DMS, the federated login request from the cluster of storage nodes to a centralized management service for the DMS. The apparatus may further include means for receiving, from the centralized management service, a SAML assertion that indicates an identity of the user, a set of object-level permissions assigned to the user, and an identifier of a first tenant of the one or more tenants associated with the user. The apparatus may further include means for identifying, by the DMS, one or more computing objects in the cluster of storage nodes that correspond to the first tenant based on the identifier from the SAML assertion. The apparatus may further include means for determining, by the DMS, that the user is authorized to perform a set of actions on the one or more computing objects based on the set of object-level permissions indicated by the SAML assertion.

A non-transitory computer-readable medium storing code for data management is described. The code may include instructions executable by a processor to receive, at a user interface associated with a cluster of storage nodes in a DMS, a federated login request from a user associated with one or more tenants of the DMS. The instructions may be further executable by the processor to redirect the federated login request from the cluster of storage nodes to a centralized management service for the DMS. The instructions may be further executable by the processor to receive, from the centralized management service, a SAML assertion that indicates an identity of the user, a set of object-level permissions assigned to the user, and an identifier of a first tenant of the one or more tenants associated with the user. The instructions may be further executable by the processor to identify one or more computing objects in the cluster of storage nodes that correspond to the first tenant based on the identifier from the SAML assertion. The instructions may be further executable by the processor to determine that the user is authorized to perform a set of actions on the one or more computing objects based on the set of object-level permissions indicated by the SAML assertion.

Some examples of the methods, apparatuses, and non-transitory computer-readable media described herein may further include operations, features, means, or instructions for generating, by the DMS, an audit log that indicates an authentication protocol associated with the federated login request, an identifier of the user associated with the federated login request, and the identifier of the first tenant associated with the user.

In some examples of the methods, apparatuses, and non-transitory computer-readable media described herein, the audit log includes multiple entries corresponding to previous federated login sessions between the user and the DMS and at least one entry in the audit log corresponds to a second tenant of the DMS and includes an identifier of the second tenant.

Some examples of the methods, apparatuses, and non-transitory computer-readable media described herein may further include operations, features, means, or instructions for establishing, by the DMS, a federated login session between the DMS and the user in accordance with the federated login request, where the user is unable to perform unauthorized actions or access data associated with tenants other than the first tenant during the federated login session.

Some examples of the methods, apparatuses, and non-transitory computer-readable media described herein may further include operations, features, means, or instructions for determining, by the DMS, whether the user is authorized to access a live mount of a computing system (e.g., one or more databases or virtual machines) based on tenant-specific context information associated with the federated login request and tenant-specific context information associated with the live mount of the computing system.

In some examples of the methods, apparatuses, and non-transitory computer-readable media described herein, the live mount of the computing system may be inaccessible to the user if the tenant-specific context information associated with the federated login request is different from the tenant-specific context information associated with the live mount of the computing system.

Some examples of the methods, apparatuses, and non-transitory computer-readable media described herein may further include operations, features, means, or instructions for generating, by the DMS, a deliverable that includes data associated with the first tenant of the DMS.

Some examples of the methods, apparatuses, and non-transitory computer-readable media described herein may further include operations, features, means, or instructions for causing, by the DMS, the deliverable to be displayed in the user interface according to the set of object-level permissions assigned to the user.

In some examples of the methods, apparatuses, and non-transitory computer-readable media described herein, the deliverable includes a dashboard, an event log, an audit log, a report, or any combination thereof.

In some examples of the methods, apparatuses, and non-transitory computer-readable media described herein, the first tenant is an MSP that manages data for multiple sub-tenants below the first tenant within a hierarchy of tenants for the DMS.

In some examples of the methods, apparatuses, and non-transitory computer-readable media described herein, the set of object-level permissions indicated by the SAML assertion correspond to tenant-specific RBAC permissions assigned to the user.

In some examples of the methods, apparatuses, and non-transitory computer-readable media described herein, the centralized management service may be operable to manage data protection services for data sources associated with multiple tenants of the DMS.

The following provides an overview of aspects of the present disclosure:

Aspect 1: A method for data management, comprising: receiving, at a user interface associated with a cluster of storage nodes in a DMS, a federated login request from a user associated with one or more tenants of the DMS; redirecting, by the DMS, the federated login request from the cluster of storage nodes to a centralized management service for the DMS; receiving, from the centralized management service, a SAML assertion that indicates an identity of the user, a set of object-level permissions assigned to the user, and an identifier of a first tenant of the one or more tenants associated with the user; identifying, by the DMS, one or more computing objects in the cluster of storage nodes that correspond to the first tenant based at least in part on the identifier from the SAML assertion; and determining, by the DMS, that the user is authorized to perform a set of actions on the one or more computing objects based at least in part on the set of object-level permissions indicated by the SAML assertion.

Aspect 2: The method of aspect 1, further comprising: generating, by the DMS, an audit log that indicates an authentication protocol associated with the federated login request, an identifier of the user associated with the federated login request, and the identifier of the first tenant associated with the user.

Aspect 3: The method of aspect 2, wherein the audit log comprises a plurality of entries corresponding to previous federated login sessions between the user and the DMS; and at least one entry in the audit log corresponds to a second tenant of the DMS and includes an identifier of the second tenant.

Aspect 4: The method of any of aspects 1 through 3, further comprising: establishing, by the DMS, a federated login session between the DMS and the user in accordance with the federated login request, wherein the user is unable to perform unauthorized actions or access data associated with tenants other than the first tenant during the federated login session.

Aspect 5: The method of any of aspects 1 through 4, further comprising: determining, by the DMS, whether the user is authorized to access a live mount of a computing system (e.g., one or more databases or virtual machines) based at least in part on tenant-specific context information associated with the federated login request and tenant-specific context information associated with the live mount of the computing system.

Aspect 6: The method of aspect 5, wherein the live mount of the computing system is inaccessible to the user if the tenant-specific context information associated with the federated login request is different from the tenant-specific context information associated with the live mount of the computing system.

Aspect 7: The method of any of aspects 1 through 6, further comprising: generating, by the DMS, a deliverable that includes data associated with the first tenant of the DMS; and causing, by the DMS, the deliverable to be displayed in the user interface according to the set of object-level permissions assigned to the user.

Aspect 8: The method of aspect 7, wherein the deliverable comprises a dashboard, an event log, an audit log, a report, or any combination thereof.

Aspect 9: The method of any of aspects 1 through 8, wherein the first tenant is an MSP that manages data for a plurality of sub-tenants below the first tenant within a hierarchy of tenants for the DMS.

Aspect 10: The method of any of aspects 1 through 9, wherein the set of object-level permissions indicated by the SAML assertion correspond to tenant-specific RBAC permissions assigned to the user.

Aspect 11: The method of any of aspects 1 through 10, wherein the centralized management service is operable to manage data protection services for data sources associated with a plurality of tenants of the DMS.

Aspect 12: An apparatus for data management, comprising: a processor; memory coupled with the processor; and instructions stored in the memory and executable by the processor to cause the apparatus to perform a method of any of aspects 1 through 11.

Aspect 13: An apparatus for data management, comprising at least one means for performing a method of any of aspects 1 through 11.

Aspect 14: A non-transitory computer-readable medium storing code for data management, the code comprising instructions executable by a processor to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:
   receiving, at a user interface associated with a cluster of storage nodes in a data management system (DMS), a federated login request from a user associated with one or more tenants of the DMS;
   redirecting, by the DMS, the federated login request from the cluster of storage nodes to a centralized management service for the DMS;
   receiving, at the cluster of storage nodes from the centralized management service, a security assertion markup language (SAML) assertion that indicates an identity of the user, a set of object-level permissions assigned to the user, and an identifier of a first tenant of the one or more tenants associated with the user, the set of object-level permissions corresponding to a set of computing objects that the user is authorized to access and a set of actions the user is authorized to perform on the set of computing objects;
   identifying, by the DMS, one or more computing objects that are included in the cluster of storage nodes and that correspond to the first tenant based at least in part on the identifier from the SAML assertion; and
   determining, by the DMS, that the user is authorized to perform the set of actions on the one or more computing objects included in the cluster of storage nodes based at least in part on the set of object-level permissions indicated by the SAML assertion.

2. The method of claim 1, further comprising:
   generating, by the DMS, an audit log that indicates an authentication protocol associated with the federated login request, an identifier of the user associated with the federated login request, and the identifier of the first tenant associated with the user.

3. The method of claim 2, wherein:
   the audit log comprises a plurality of entries corresponding to previous federated login sessions between the user and the DMS; and
   at least one entry in the audit log corresponds to a second tenant of the DMS and includes an identifier of the second tenant.

4. The method of claim 1, further comprising:
   establishing, by the DMS, a federated login session between the DMS and the user in accordance with the federated login request, wherein the user is unable to perform unauthorized actions or access data associated with tenants other than the first tenant during the federated login session.

5. The method of claim 1, further comprising:
   determining, by the DMS, whether the user is authorized to access a live mount of a computing system based at least in part on tenant-specific context information associated with the federated login request and tenant-specific context information associated with the live mount of the computing system.

6. The method of claim 5, wherein the live mount of the computing system is inaccessible to the user if the tenant-specific context information associated with the federated login request is different from the tenant-specific context information associated with the live mount of the computing system.

7. The method of claim 1, further comprising:
   generating, by the DMS, a deliverable that includes data associated with the first tenant of the DMS; and
   causing, by the DMS, the deliverable to be displayed in the user interface according to the set of object-level permissions assigned to the user.

8. The method of claim 7, wherein the deliverable comprises a dashboard, an event log, an audit log, a report, or any combination thereof.

9. The method of claim 1, wherein the first tenant is a managed service provider (MSP) that manages data for a plurality of sub-tenants below the first tenant within a hierarchy of tenants for the DMS.

10. The method of claim 1, wherein the set of object-level permissions indicated by the SAML assertion correspond to tenant-specific role-based access control (RBAC) permissions assigned to the user.

11. The method of claim 1, wherein the centralized management service is operable to manage data protection services for data sources associated with a plurality of tenants of the DMS.

12. An apparatus for data management, comprising:
   a processor;
   memory coupled with the processor; and
   instructions stored in the memory and executable by the processor to cause the apparatus to:
   receive, at a user interface associated with a cluster of storage nodes in a data management system (DMS), a federated login request from a user associated with one or more tenants of the DMS;
   redirect, by the DMS, the federated login request from the cluster of storage nodes to a centralized management service for the DMS;
   receive, at the cluster of storage nodes from the centralized management service, a security assertion markup language (SAML) assertion that indicates an identity of the user, a set of object-level permissions assigned to the user, and an identifier of a first tenant of the one or more tenants associated with the user, the set of object-level permissions corresponding to a set of computing objects that the user is authorized to access and a set of actions the user is authorized to perform on the set of computing objects;

identify, by the DMS, one or more computing objects that are included in the cluster of storage nodes and that correspond to the first tenant based at least in part on the identifier from the SAML assertion; and determine, by the DMS, that the user is authorized to perform the set of actions on the one or more computing objects included in the cluster of storage nodes based at least in part on the set of object-level permissions indicated by the SAML assertion.

13. The apparatus of claim 12, wherein the instructions are further executable by the processor to cause the apparatus to:

generate, by the DMS, an audit log that indicates an authentication protocol associated with the federated login request, an identifier of the user associated with the federated login request, and the identifier of the first tenant associated with the user.

14. The apparatus of claim 13, wherein:

the audit log comprises a plurality of entries corresponding to previous federated login sessions between the user and the DMS; and at least one entry in the audit log corresponds to a second tenant of the DMS and includes an identifier of the second tenant.

15. The apparatus of claim 12, wherein the instructions are further executable by the processor to cause the apparatus to:

establish, by the DMS, a federated login session between the DMS and the user in accordance with the federated login request, wherein the user is unable to perform unauthorized actions or access data associated with tenants other than the first tenant during the federated login session.

16. The apparatus of claim 12, wherein the instructions are further executable by the processor to cause the apparatus to:

determine, by the DMS, whether the user is authorized to access a live mount of a computing system based at least in part on tenant-specific context information associated with the federated login request and tenant-specific context information associated with the live mount of the computing system.

17. The apparatus of claim 16, wherein the live mount of the computing system is inaccessible to the user if the tenant-specific context information associated with the federated login request is different from the tenant-specific context information associated with the live mount of the computing system.

18. The apparatus of claim 12, wherein the instructions are further executable by the processor to cause the apparatus to:

generate, by the DMS, a deliverable that includes data associated with the first tenant of the DMS; and cause, by the DMS, the deliverable to be displayed in the user interface according to the set of object-level permissions assigned to the user.

19. The apparatus of claim 18, wherein the deliverable comprises a dashboard, an event log, an audit log, a report, or any combination thereof.

20. A non-transitory computer-readable medium storing code for data management, the code comprising instructions executable by a processor to:

receive, at a user interface associated with a cluster of storage nodes in a data management system (DMS), a federated login request from a user associated with one or more tenants of the DMS;

redirect, by the DMS, the federated login request from the cluster of storage nodes to a centralized management service for the DMS;

receive, at the cluster of storage nodes from the centralized management service, a security assertion markup language (SAML) assertion that indicates an identity of the user, a set of object-level permissions assigned to the user, and an identifier of a first tenant of the one or more tenants associated with the user, the set of object-level permissions corresponding to a set of computing objects that the user is authorized to access and a set of actions the user is authorized to perform on the set of computing objects;

identify, by the DMS, one or more computing objects that are included in the cluster of storage nodes and that correspond to the first tenant based at least in part on the identifier from the SAML assertion; and determine, by the DMS, that the user is authorized to perform the set of actions on the one or more computing objects that are included in the cluster of storage nodes based at least in part on the set of object-level permissions indicated by the SAML assertion.

* * * * *